T. LARSSON.
AUTOMATIC SHUT-OFF VALVE FOR ELEVATORS.
APPLICATION FILED JULY 29, 1904.

1,009,074.

Patented Nov. 21, 1911.

2 SHEETS—SHEET 2.

Witnesses:
C. F. Mason.
M. E. Regan.

Inventor:
T. Larsson.
By his Attorneys
Southgate & Southgate derDec# UNITED STATES PATENT OFFICE.

THURE LARSSON, OF WORCESTER, MASSACHUSETTS, ASSIGNOR TO HIMSELF, FRED A. JONES, OF WORCESTER, MASSACHUSETTS, AND WILLIAM E. D. STOKES, OF NEW YORK, N. Y.

AUTOMATIC SHUT-OFF VALVE FOR ELEVATORS.

1,009,074.  Specification of Letters Patent.  Patented Nov. 21, 1911.

Application filed July 29, 1904. Serial No. 218,660.

*To all whom it may concern:*

Be it known that I, THURE LARSSON, a subject of the King of Sweden, residing at Worcester, in the county of Worcester and State of Massachusetts, have invented a new and useful Automatic Shut-Off Valve for Elevators, of which the following is a specification.

The object of this invention is to improve the automatic shut-off valves used to limit the runs of hydraulic elevators.

The improvements are shown in the accompanying two sheets of drawings, in which—

Figure 1:
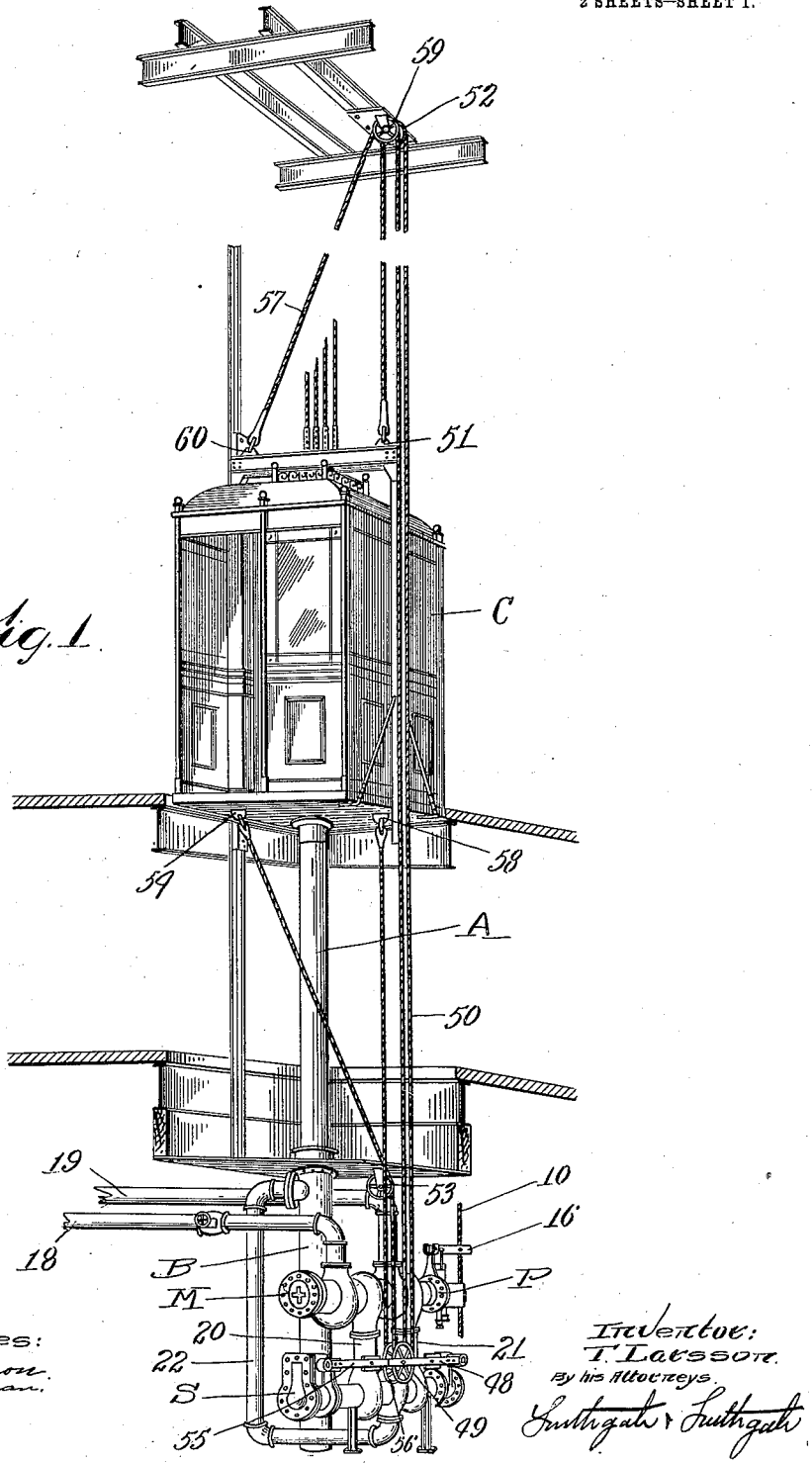
Figure 2:
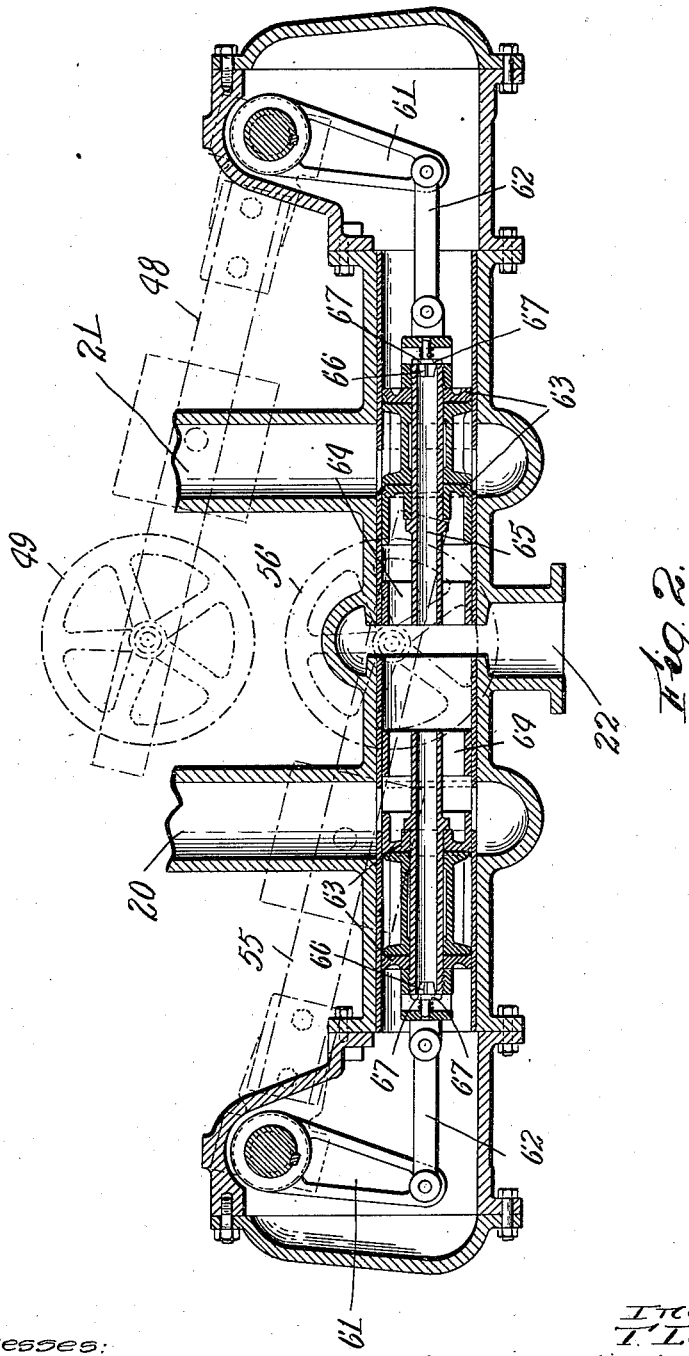

Figure 1 is a perspective view of a plunger hydraulic elevator equipped with the improvements, and Fig. 2 is a sectional view through the shut-off valves.

In detail A designates the plunger, B the cylinder, and C the car of the elevator. The valve mechanism proper consists of a main valve M and a pilot valve P, the lever 16 of which is actuated by a rope 10 which may extend to any of the usual controlling devices mounted on the car.

S designates a double automatic or shut-off valve.

A pressure pipe 18 and an exhaust pipe 19 are connected to the main valve M, which latter connects to the shut-off valve S by two connecting pipes 20 and 21. The shut-off valves connect by pipe 22 to cylinder B. These parts are so arranged that when the pilot valve P is operated to cause the main valve to move to the left relatively to Fig. 1, pressure will flow in through pipe 18, main valve M, connection 20, shut-off valve S, and pipe 22 to the cylinder B, to cause the car to ascend, and so that when the pilot valve P is operated to shift the main valve to the right, the water will flow from the cylinder B through pipe 22, shut-off valve S, connection 21, main valve M, and exhaust pipe 19 to allow the car to descend.

Referring now to the shut-off valves S, it will be seen that there are two valves, one arranged between pipe 20 and pipe 22 to control the pressure, and the other between pipe 21 and pipe 22 to control the exhaust, and that they are substantially rights and lefts. The right hand valve is used to check and stop the car on its downward run and the left hand valve to check and stop the car on its upward run. The right hand one of said valves is operated from a weighted arm 48 which carries a sheave 49. A running rope 50 is attached to the top of the car at 51, passes up over a sheave 52, down around said sheave 49, over a sheave 53, and is secured to the car at 54, at practically the opposite side thereof relatively to 51. When the car is at the top of its run and starts downward, 51 will take up on the rope 50 and 54 will pay out the rope 50 practically at the same speed. But as the car approaches the lower end of its run, 54 will not pay out the rope 50 as fast as the same is being taken up by 51 owing to the accelerated increasing angular deflection of the rope between sheaves 53 and 54. Hence, the arm 48 will be lifted at an accelerating speed, whereby the speed of the car will be slowed down some time before it reaches the bottom of its run, hence insuring a gradual and accurate stopping of the car, no matter what was its downward speed. The left hand shut-off valve is actuated by a similar weighted arm 55 which carries sheaves 56. Another running rope 57 is connected to the bottom of the car at 58, passes down around sheave 56, up over a sheave 59, and then is attached to the car at 60, at practically the other side thereof relatively to 58. By this arrangement, as the car moves upward, 58 will take up on the running rope 57, and 60 will pay out said rope, but as the car reaches the uppermost limits of its travel, the rope 57 will not be paid out between 60 and 59 as rapidly as it is taken up by 58, owing to the accelerated increasing angular deflection of the rope between 60 and 59, and hence, the arm 55 will be raised with an accelerating movement and the car gradually and accurately brought to a state of rest at its upper extreme of travel. These running controlling ropes 50 and 57 are arranged so that they act only as the car reaches the points where it is desired to slow down, and do not act to affect the intermediate full speed movement in either direction.

Referring now to the detail of the shut-off valves, the right hand one will be described: The arm 48 is mounted on a shaft which projects inside the casing, and carries an arm 61 which connects by link 62 to the valve proper which consists of a double valve 63 and a ring valve 64 mounted upon a hollow stem 65, the end of which is closed by a check valve 66, through which are bored small holes 67. When the valve is moved to the left the double valve 63 will close the ports communicating with pipe 21, and this movement can take place as fast as the rope 50 pulls up on the sheaves 49, as the check valve 66 will open to permit the water to flow from the left hand side of the valve 63 to the right hand side. When the rope 50 slacks to permit the weighted arm 48 to descend the movement of the valve to the right will be regulated by the size of the openings 67.

In ordinary operation the ring valve 64 performs no function, but if the rope 50 should break, the weighted arm 48 will move the valve to an extreme position to the right, so that the valve 64 will close the openings into pipe 21. The small holes 67 make this movement an easy and gradual one, and prevent an instantaneous shut-off to cause a water hammer.

The left hand shut-off valve is constructed the same as that just described, and operates the same, except that it is arranged to operate when the car reaches the uppermost limit of its travel.

It will be seen that when the right hand shut-off valve moves to check and stop the exhaust from the elevator cylinder, as shown in the drawing, the left hand shut-off valve still leaves full communication between pipe 20 and pipe 22. Hence, although the car is gradually stopped as it comes to its lowest extreme, it is possible to start upward from the lowest position at full speed. The same action takes place when the left hand shut-off valve comes into operation as the car reaches the uppermost part of its travel, that is, the right hand shut-off valve leaves full communication between pipes 22 and 21, so that it is possible to start down at full speed.

By the arrangement thus described, a shut-off valve mechanism is provided which will gradually bring the car to a state of rest at either end of its run and still leave the same free to start back in the opposite direction at full speed; and a mechanism by which the car will be stopped at proper speed in case of derangement or accident.

The details and arrangements herein described may be greatly varied by a skilled mechanic without departing from the scope of my invention as expressed in the claims.

Having thus fully described my invention, what I claim and desire to secure by Letters Patent is:—

1. The combination of a hydraulic elevator, a main valve, an automatic shut-off valve having two independently movable valves, two connections between the main valve and the shut-off valve, and a connection from the shut-off valve to the cylinder, and means for gradually closing one or the other of the shut-off valves as the elevator reaches the limits of its run in either direction, the other valve remaining open to permit a start of the elevator at full speed in the opposite direction.

2. The combination with a hydraulic elevator, of a main valve, two independently movable shut-off valves, each having a connection with the main valve, a connection between the shut-off valves and the cylinder of the elevator, and means for gradually closing one of the shut-off valves when the elevator reaches the limit of its run in one direction, while the other shut-off valve remains open to permit a start of the elevator at full speed in the opposite direction.

3. The combination in an automatic stop valve mechanism, of the valve, and a flexible member for operating the same, the valve being constructed and arranged and provided with means to close its port gradually in case of breakage of said connection.

4. A stop valve mechanism comprising a valve, a hollow stem therefor, a ring valve mounted on the hollow stem, and a check-valve having holes through the same for controlling the flow through the hollow stem.

5. A stop-valve consisting of a valve, and a ring-valve arranged on a hollow stem, the flow through which is controlled by a check valve having holes through the same arranged so that in case of accident the ring-valve will act at a graduated speed.

6. In an elevator mechanism, the combination of a hydraulic elevator cylinder, a main valve having supply and exhaust connections, a stop valve casing having two connections with the main valve, and a single connection with said cylinder, whereby the water passing to and from the cylinder will pass through said stop valve casing, two independently operated stop valves arranged in said casing, a car, and means connected with the car for operating one or the other of said valves as the elevator reaches the limits of its travel in either direction to close one or the other of the connections between the main valve and the shut-off valve.

7. In a hydraulic elevator, the combination of a cylinder, a main valve, a stop valve casing, a supply and exhaust connection between the stop valve casing and the main valve, two independently operated stop valves in said casing, an elevator car, and means connected with and operated by the motion of said car for operating one of said stop valves as the car reaches its limit of travel in one direction, and the other when the car reaches its limit of travel in the other direction without operating the other valve in each case.

In testimony whereof I have hereunto set my hand, in the presence of two subscribing witnesses.

THURE LARSSON.

Witnesses:
LOUIS W. SOUTHGATE,
ANGIE M. GODDARD.

Copies of this patent may be obtained for five cents each, by addressing the "Commissioner of Patents, Washington, D. C."